(12) United States Patent
Yang et al.

(10) Patent No.: US 11,557,123 B2
(45) Date of Patent: Jan. 17, 2023

(54) SCENE CHANGE METHOD AND SYSTEM COMBINING INSTANCE SEGMENTATION AND CYCLE GENERATIVE ADVERSARIAL NETWORKS

(71) Applicant: SHANDONG UNIVERSITY, Shandong (CN)

(72) Inventors: Yang Yang, Qingdao (CN); Chenguan Li, Qingdao (CN); Peng Xu, Qingdao (CN); Yunxia Liu, Qingdao (CN); Man Guo, Qingdao (CN); Yujun Li, Qingdao (CN)

(73) Assignee: SHANDONG UNIVERSITY, Qindao (CN)

( * ) Notice: Subject to any disclaimer, the term of this patent is extended or adjusted under 35 U.S.C. 154(b) by 20 days.

(21) Appl. No.: 17/344,629

(22) Filed: Jun. 10, 2021

(65) Prior Publication Data
US 2021/0390319 A1 Dec. 16, 2021

(30) Foreign Application Priority Data

Jun. 11, 2020 (CN) .......................... 202010529062.7

(51) Int. Cl.
*G06V 40/10* (2022.01)
*G06V 20/40* (2022.01)

(52) U.S. Cl.
CPC .............. *G06V 20/49* (2022.01); *G06V 20/41* (2022.01); *G06V 20/46* (2022.01); *G06V 40/10* (2022.01)

(58) Field of Classification Search
CPC ........ G06V 20/49; G06V 20/46; G06V 40/10; G06V 20/41; G06V 10/82; G06V 20/70; G06V 20/52
See application file for complete search history.

(56) References Cited

U.S. PATENT DOCUMENTS

| | | | |
|---|---|---|---|
| 2020/0175375 A1* | 6/2020 | Chen | G06N 3/084 |
| 2021/0142577 A1* | 5/2021 | Thomas | G06K 9/6256 |
| 2021/0150676 A1* | 5/2021 | Sytnik | G06T 7/11 |
| 2021/0312635 A1* | 10/2021 | Price | G06V 10/40 |
| 2021/0390710 A1* | 12/2021 | Zhang | G11B 27/031 |

* cited by examiner

*Primary Examiner* — Syed Haider
(74) *Attorney, Agent, or Firm* — Oliff PLC

(57) ABSTRACT

A scene change method and system combining instance segmentation and cycle generative adversarial networks are provided. The method includes: processing a video of a target scene and then inputting the video into an instance segmentation network to obtain segmented scene components, that is, obtain mask cut images of the target scene; and processing targets in the mask cut images of the target scene by using cycle generative adversarial networks according to the requirements of temporal attributes to generate data in a style-migrated state, and generating style-migrated targets with unfixed spatial attributes into a style-migrated static scene according to a specific spatial trajectory to achieve a scene change effect.

10 Claims, 3 Drawing Sheets

SCENE CHANGE METHOD AND SYSTEM COMBINING INSTANCE SEGMENTATION AND CYCLE GENERATIVE ADVERSARIAL NETWORKS

FIELD OF THE INVENTION

The present disclosure belongs to the field of image recognition technology, and particularly relates to a scene change method and system combining instance segmentation and cycle generative adversarial networks.

BACKGROUND OF THE INVENTION

The statement of this section merely provides background art information related to the present disclosure, and does not necessarily constitute the prior art.

Deep learning is an algorithm edged tool in the era of big data, and it is also a key technology for this round of artificial intelligence outbreak. Compared with traditional machine learning algorithms, deep learning technology can continuously improve its performance as the scale of data increases, while the traditional machine learning algorithms can hardly use mass data to continuously improve their performance. The convolutional neural network is a deep neural network model that has been widely used in academia and industry. It has been widely used in the field of computer vision, and its performance in tasks such as image classification, target detection, and semantic segmentation greatly exceeds traditional methods.

However, the deep learning technology still has limitations. First, the success of deep learning relies on a large amount of manually annotated training data. If the amount of training data is not large enough or the data quality is not high, it will affect the effect of a deep learning network, which limits the development of deep learning to a certain extent. Second, training data and test data for deep learning should be similar in structure and content. The stronger the consistency between the training environment and the test environment is, the better the application effect is.

Therefore, in actual applications of deep learning, such as video surveillance, target detection and other fields, it is not easy to obtain a large amount of high-quality data in these scenes due to the limitations of human and material resources, and it is also difficult to provide a consistent environment in the training process as in the test process. As such, scene data may be missing or inconsistent, for example, the training scene and the test scene are inconsistent, the same scene lacks data of a certain season, or, the same scene has data of only day or night. The incompleteness of the training and testing scenes will result in missing of scene data in a specific state in a database, which will affect subsequent data processing and analysis.

SUMMARY OF THE INVENTION

In order to overcome the above shortcomings of the prior art, the present disclosure provides a scene change method combining instance segmentation and cycle generative adversarial networks, which can complete scene change based on targets according to temporal and spatial attributes of segmented content when data of the same scene is lacking, and then integrate new scene content, thereby enriching a data set.

To achieve the above objective, one or more embodiments of the present disclosure provide the following technical solutions:

On the one hand, a scene change method combining instance segmentation and cycle generative adversarial networks is disclosed, including:
processing a video of a target scene and then inputting the video into an instance segmentation network to obtain segmented scene components, that is, obtain mask cut images of the target scene; and
processing targets in the mask cut images of the target scene by using cycle generative adversarial networks according to the requirements of temporal attributes to generate data in a style-migrated state, then classifying the targets according to the requirements of spatial attributes, and if the spatial attributes of the targets are spatially unfixed, generating the targets according to a specific spatial trajectory to achieve a scene change effect.

On the other hand, a scene change system combining instance segmentation and cycle generative adversarial networks is disclosed, including:
an instance segmentation module, configured to: process a video of a target scene and then input the video into an instance segmentation network to obtain segmented scene components, that is, obtain mask cut images of the target scene; and
a scene change module, configured to: process targets in the mask cut images of the target scene by using cycle generative adversarial networks spatial attribute requirements to generate data in a style-migrated state, and generate style-migrated targets with unfixed spatial attributes according to a specific spatial trajectory to achieve a scene change effect.

One or more of the above technical solutions have the following beneficial effects:

The technical solution of the present disclosure combines an instance segmentation method and a method of generating an adversarial network model for seasonal or temporal change of a specific scene, so that the migrated image can fill in the missing scene data in a specific state in a database.

There is no excessive requirement for the amount of original data, and the original data set is allowed to lack data in a certain season or period. The scene change technology fills in the missing of the original scene data set, further enriches the data set, and can provide a powerful data support for the effect of deep learning.

Compared with the existing scene change, targets in the target scene are segmented through the instance segmentation technology, and data thereof are used separately for training according to the requirements of temporal and spatial attributes, which ensures the change effect of spatially fixed targets that have undesired effect in scene change, and can achieve special processing, thereby stabilizing the overall effect.

Compared with the existing scene change, targets in the target scene are classified and segmented through the instance segmentation technology, and data thereof are used separately for training according to the requirements of temporal and spatial attributes, which ensures the change effect of spatially unfixed targets that have undesired effect in scene change, thereby improving the overall effect.

According to the actual production, a scene change method for a region or target in a scene is proposed, which is completed by multiple models, and its effect is superior to the method using only one network.

BRIEF DESCRIPTION OF THE DRAWINGS

The accompanying drawings constituting a part of the present disclosure are used for providing a further understanding of the present disclosure, and the schematic embodiments of the present disclosure and the descriptions thereof are used for interpreting the present disclosure, rather than constituting improper limitations to the present disclosure.

DETAILED DESCRIPTION OF EMBODIMENTS

It should be noted that the following detailed descriptions are exemplary and are intended to provide further descriptions of the present disclosure. All technical and scientific terms used herein have the same meaning as commonly understood by those of ordinary skill in the technical field to which the present disclosure belongs, unless otherwise indicated.

It should be noted that the terms used here are merely used for describing specific embodiments, but are not intended to limit the exemplary embodiments of the present invention. As used herein, unless otherwise clearly stated in the context, the singular form is also intended to include the plural form. In addition, it should also be understood that when the terms "include" and/or "comprise" are used in the Description, they indicate that there are features, steps, operations, devices, components, and/or combinations thereof.

The embodiments in the present disclosure and the features in the embodiments can be combined with each other in the case of without conflicts.

Explanation of Terms

Instance Segmentation: a machine automatically frames different instances from an image using a target detection method, and then marks the instances in different instance regions pixel by pixel using a semantic segmentation method to finally obtain masks of detected targets.

Cycle Generative Adversarial Network (CycleGAN): CycleGAN was put forward in an article of "Unpaired Image-to-Image Translation using Cycle-Consistent Adversarial Networks" published in 2017, and two very similar articles DualGAN and DiscoGAN were published in the same period. In brief, their function is: automatically convert a certain type of images into another type of images. The traditional GAN is unidirectionally generated, while CycleGAN is mutually generated. The network is a cycle, so it is named Cycle. CycleGAN is very practical in that two images inputted can be any two images, that is, unpaired.

Mask R-CNN: Mask R-CNN is an instance segmentation model, which can determine the position and category of each target in an image and provide pixel-level prediction.

Embodiment 1

This embodiment discloses a scene change method combining instance segmentation and cycle generative adversarial networks, an automatic image instance segmentation method based on Mask R-CNN, and a regional scene change method of a cycle generative adversarial network based on temporal and spatial attribute requirements.

Mask R-CNN can be regarded as a general instance segmentation framework. It is extended from Faster R-CNN as a prototype. For each Proposal Box of Faster R-CNN, a full convolutional network is used for semantic segmentation. In addition, RoI Align is introduced to replace RoI Pooling in Faster RCNN, because RoI Pooling is not aligned one by one according to pixels, which has a great impact on the precision of segmented masks.

Figure 1:
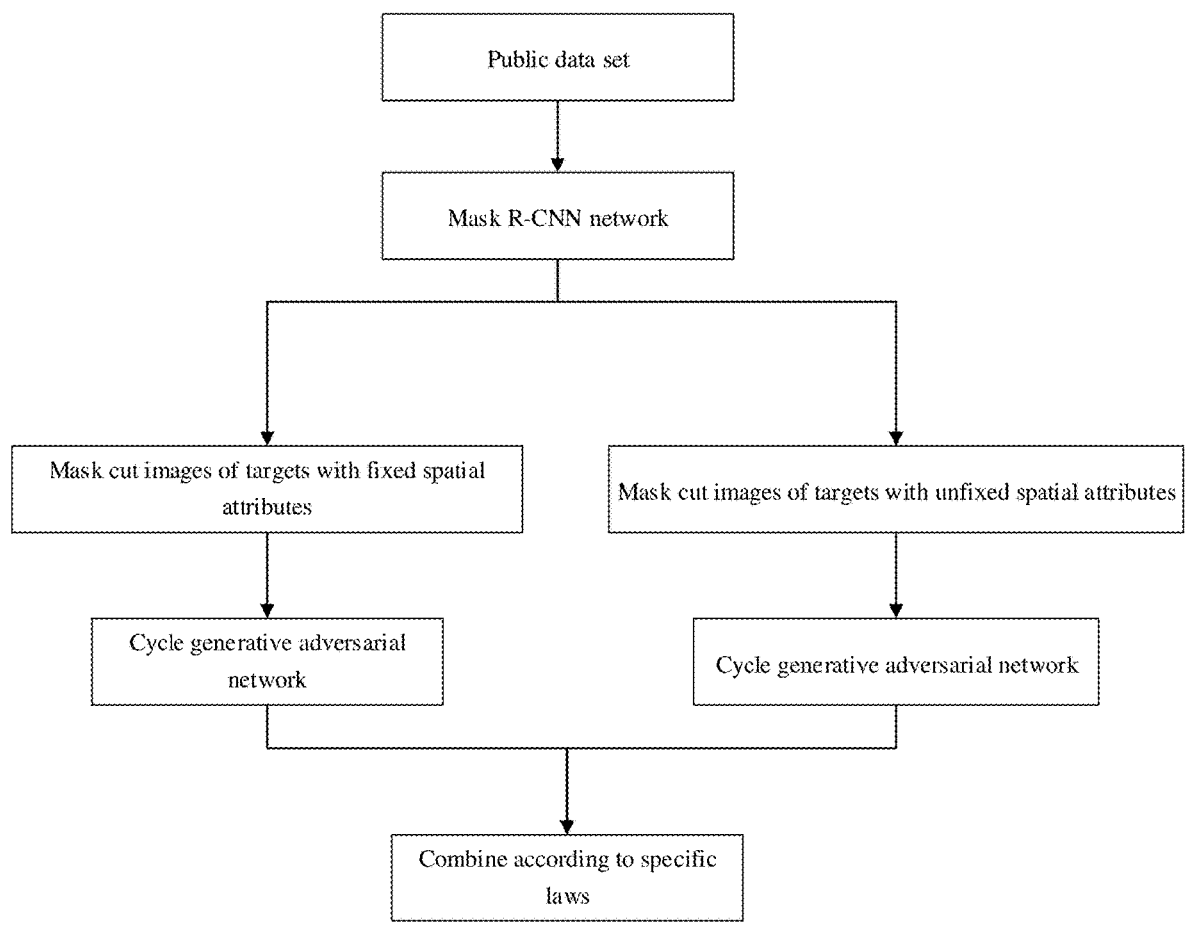
FIG. 1 is a flowchart of a method according to an embodiment of the present disclosure.

As shown in FIG. 1, in a specific embodiment, the scene change method combining instance segmentation and cycle generative adversarial networks includes: automatic image instance segmentation is implemented based on a Mask R-CNN model that can be used for instance segmentation:

First, a public data set or a private data set is annotated based on the content, and the public data set is inputted into Mask R-CNN for training, so that the network has content-based target segmentation ability;

The Mask R-CNN trained with the public training set has the ability to segment a target scene, a video of the target scene is acquired, and frame images thereof are extracted and integrated as a data set;

The integrated data set is inputted into the Mask R-CNN, scene components segmented by the Mask R-CNN can be obtained after output, and specifically, the target scene is segmented and cut according to mask coordinate information.

The present invention is also based on a universal generative adversarial network, and this model has been proven to be very effective in generative expected image applications. Generally, GAN converts one type of images into another type of images. That is, there are two sample spaces: X and Y, and we hope to convert samples in the X sample space into samples in the Y sample space. As such, the actual purpose is to learn mapping F from X to Y. The mapping F corresponds to a generator in GAN, and F can convert an image X in the X sample space into an image F(x) in the Y sample space. For the generated image, a discriminator in GAN is required to determine whether it is a real image. The purpose of the generated image is to fool the discriminator such that the discriminator thinks it is a real image to achieve a fake effect, and the purpose of the discriminator is to identify the generated image, thus constituting a generative adversarial network.

Figure 3:
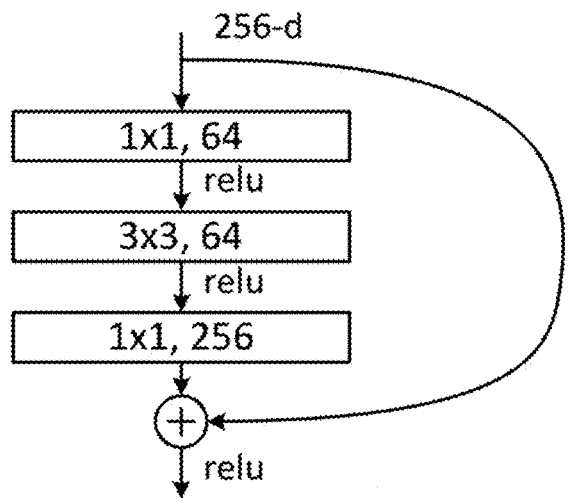
FIG. 3 is a schematic structural diagram of ResNet101 according to an embodiment of the present disclosure.
Figure 4:
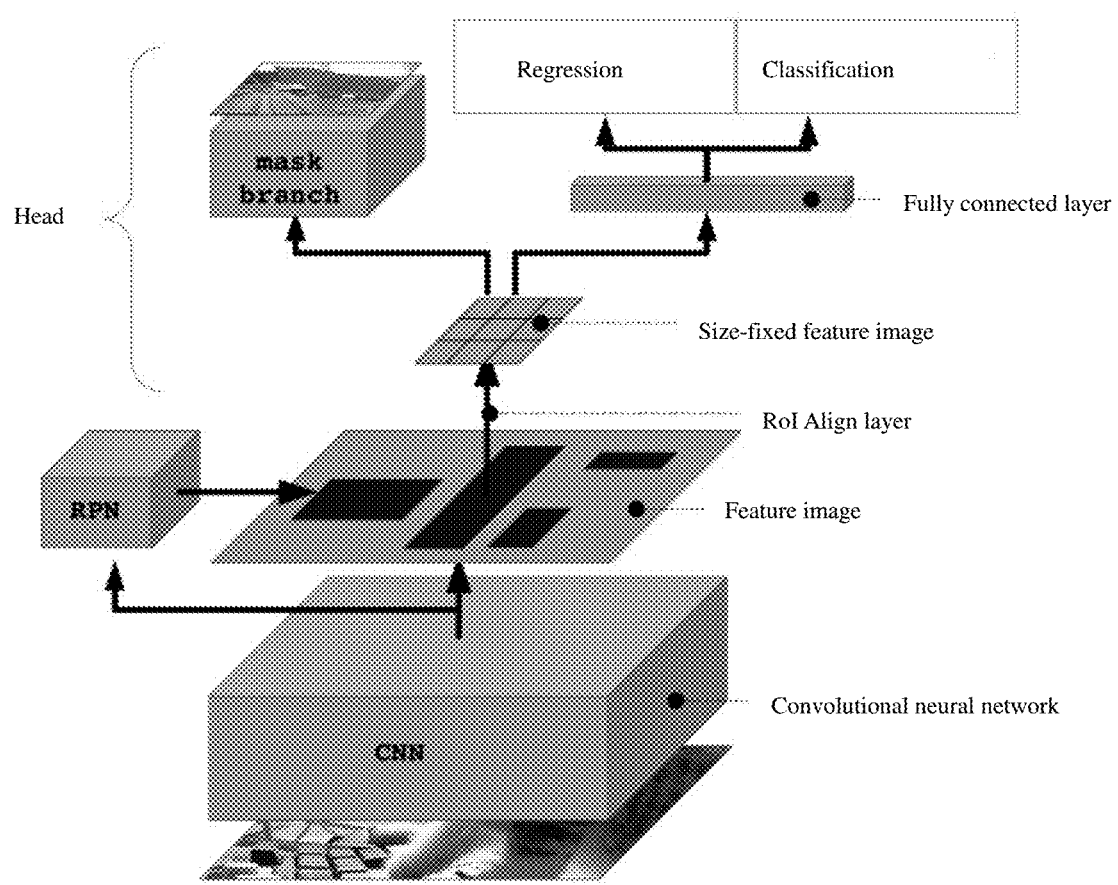
FIG. 4 is a flowchart of a Mask R-CNN algorithm according to an embodiment of the present disclosure.

Referring to FIG. 4, in a specific embodiment, the method includes:

S1: a target scene is determined, a public data set is obtained, a Cityscapes public data set that is often used for segmentation tasks is selected in this embodiment, labels required by this embodiment are selected from labels of the Cityscapes public data set (in this step of the current target scene, labels of static targets such as roads, buildings, pillars, and vegetation are selected), a surveillance video of the target scene is acquired at the same time, and the video is segmented into images as a real target scene data set, which is denoted by A;

S2: a segmentation network based on Mask R-CNN is constructed. The basic backbone networks are a ResNet101 residual convolutional network and an FPN network. The structure of the residual network is shown in FIG. 3. A residual function is added to the residual network.

If there is no residual function, as the number of network layers increases, the problem of gradient diffusion over gradient explosion will occur. However, in the presence of the residual function, the feature extraction performance of the network will not change significantly as the number of layers increases.

S2.1: after the preprocessed Cityscapes data set is inputted into a feature extraction network part of Mask R-CNN, a corresponding feature map is obtained;

S2.2: the feature map obtained in S2.1 is inputted into a region proposal network (RPN), and RoIs are outputted by the RPN;

S2.3: a RoI Align operation is performed on these RoIs outputted by the RPN in S2.2. The RoI Align operation is an improvement on RoI Pooling, and it cancels two rounding practices and obtains pixel values by bilinear differences, so that discontinuous operations become continuous, and the error will be smaller when returning to images;

S2.4: finally, the RoIs processed in S2.3 are inputted into a fully convolutional network (FCN) for regression and classification, and a mask is generated at a Mask branch;

A loss function of Mask R-CNN is:

$$L = L_{cls} + L_{box} L_{mask} \quad (1)$$

In formula (1), $L_{cls}$ is a classification loss, $L_{box}$ is a regression loss, and $L_{mask}$ is a loss function of each RoI in the mask branch. The classification loss $L_{cls}$ is the same as the classification loss in Fast R-CNN, that is:

$$L_{cls} = \frac{1}{N_{cls}} \sum_i \{-\log[p_i p_i^* + (1-p_i)(1-p_i^*)]\} \quad (2)$$

In this step of the embodiment, there is only one type of targets, so in formula (2), $N_{cls}=1$, where i is the subscript of an anchor region, $p_i$ is a predicted probability that the $i^{th}$ anchor region is predicted as a target, and $p^*_i$ is 1 when the region represented by the anchor region is a positive sample and is 0 when the region is a negative sample. $L_{box}$ is the regression loss, and is the same as a regression loss in Faster R-CNN, that is:

$$L_{box} = \lambda \frac{1}{N_{box}} \sum_i p_i^* R(t_i - t_i^*) \quad (3)$$

In formula (3), $t_i$ represents predicted bounding box coordinates, $t^{*i}$ is a true value of the bounding box coordinates, $p^*_i$ is 1 when the region represented by the anchor region is a positive sample and is 0 when the region is a negative sample, $N_{box}$ is a number of regression rectangular boxes, $\lambda$ is a weight balance parameter, $\lambda=10$ is assumed in this embodiment, R is a smooth$L_1$ function and its expression is:

$$smoothL_1(x) = \begin{cases} 0.5x^2 \times \frac{1}{\sigma^2} & \text{if } |x| < \frac{1}{\sigma^2} \\ |x| - 0.5 & \text{otherwise} \end{cases} \quad (4)$$

In this embodiment, $\sigma=1$ is assumed in formula (4). In formula (1), $L_{mask}$ is a loss function of each RoI in the mask branch, which is defined as a dichotomy mean cross-entropy loss. In Mask R-CNN, for a newly added mask branch, its output dimension for each RoI is K×m×m, where m×m represents the size of the mask, and K represents a number of categories. After the predicted mask is obtained, a sigmoid function value is solved for each pixel value of the mask, and the obtained result is used as an input of $L_{mask}$. It should be noted that only the positive sample RoI can be used for the calculation of $L_{mask}$, and the remaining masks will not have an impact on $L_{mask}$. The sigmoid function also becomes a Logistic function, which is defined by the following formula:

$$S(x) = \frac{1}{1+e^{-x}} \quad (5)$$

S3: a trained Mask R-CNN model can be obtained after the operation in S2, the data set A is inputted into the model to obtain a mask of a static part of the target scene, coordinates of the mask are saved in a csv file, the coordinates in the csv file are read with opencv to visualize the coordinates of the mask obtained from the Mask R-CNN, and then the mask is cut to obtain separate images of roads, buildings, pillars, and vegetation;

S4: the data set is pre-processed again, only human labels are selected from the labels of the Cityscapes data set, the operation in S2 is performed again to obtain a trained Mask R-CNN model, the data set A is inputted into the model to obtain a mask of a dynamic part (human) of the target scene, coordinates of the mask are saved in a csv file, the coordinates in the csv file are read with opencv to visualize the coordinates of the mask obtained from the Mask R-CNN, and then the mask is cut to obtain human images;

S1 to S4 describe an automatic image instance segmentation method based on Mask R-CNN. A scene change method based on a content-adaptive cycle generative adversarial network includes: a target scene is cut into parts using a public data set or a private data set according to mask coordinates, the parts are sorted separately, and corresponding images of each part that meet temporal attribute requirements respectively are acquired and integrated into a target training set, for example, for a summer vegetation in the target scene, images of the vegetation or similar vegetation in other seasons are integrated as a target training set;

For targets with fixed spatial attributes in the target scene, such as grass, trees, sky, roads, and street lights, mask cut images of the targets and their corresponding target training set meeting temporal attribute requirements are inputted into a cycle generative adversarial network respectively, and the cycle generative adversarial network model is trained according to different contents to obtain a content-adaptive generative adversarial network model;

Based on the trained cycle generative adversarial network model, each mask region is inputted into the model for conversion and testing according to the temporal attribute requirements, the generated data is in a style-migrated state, and then the respective style-migrated regions are integrated into a whole image based on coordinates, that is, a scene change simulation image;

For targets with unfixed spatial attributes in the target scene, such as human targets, appearing positions of the human targets in the target scene are unfixed, but the regions are fixed, such as only appearing on roads, mask cut images of the human targets and acquired human images meeting temporal attribute requirements are inputted into a cycle generative adversarial network, and the cycle generative adversarial network model is trained to obtain a better generative adversarial network model;

Based on the trained cycle generative adversarial network model, the mask cut images of the targets with unfixed spatial attributes are inputted into the trained model for conversion and testing according to the temporal attribute requirements, the generated data is in a style-migrated state, and then the style-migrated targets are moved to target appearing regions in the style-migrated scene according to a specific behavior trajectory, wherein the behavior trajectory can be predetermined by simulating a behavior such as wandering, walking, or running, and can also be pasted with target positions acquired from the scene of the public data set, which can obtain a high-quality scene change effect. These data are integrated into the original data set as a data set of the target detection model, which can achieve the purposes of enriching the original data set, making up for missing scene data, and improving the target detection efficiency.

Figure 2:
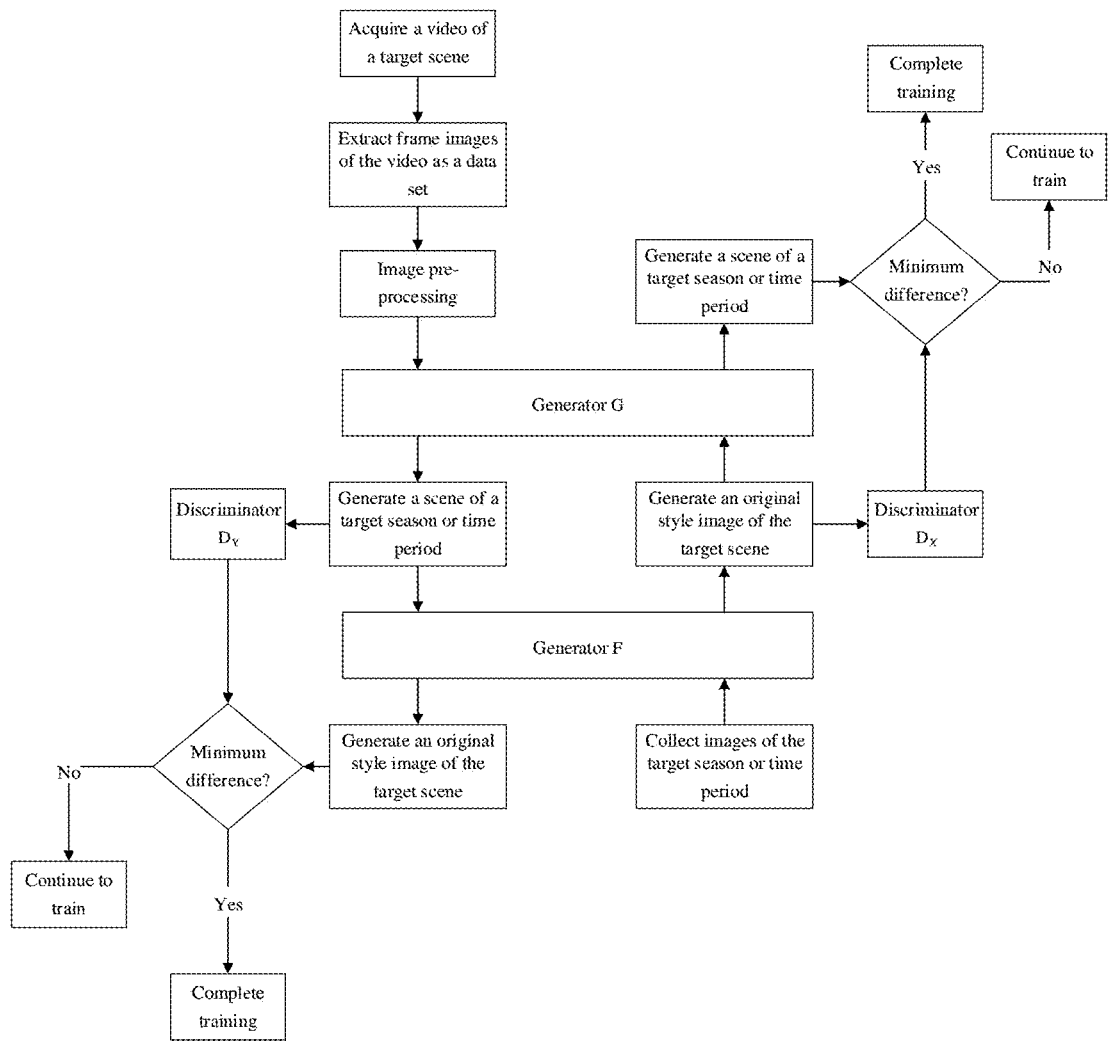
FIG. 2 is a flowchart of a cycle generative adversarial network algorithm according to an embodiment of the present disclosure.

In a specific embodiment, the scene change method based on the content-adaptive cycle generative adversarial network is specifically implemented according to the following steps:

S5: taking vegetation as an example, if it is required to migrate according to the temporal attribute "season", a data set of winter vegetation is collected as a target training set, which is denoted by y, and the vegetation images cut in S3, that is, real target scene vegetation images, are sorted into a set X;

S6: two symmetrical cycle generative adversarial networks are provided. The two cycle generative adversarial networks form a ring network, as shown in FIG. 2, the two cycle generative adversarial networks share two generators G and F, each of the two cycle generative adversarial networks has a discriminator, respectively $D_X$ and $D_Y$, and each cycle generative adversarial network has two loss functions, respectively a reconstruction loss function of the generator and a discriminant loss function of the discriminator. The specific implementation is as follows:

S6.1: in the present invention, X is inputted into the generator G, Y style simulated data of the vegetation X, denoted by X', can be obtained by training, then the reconstruction loss function is updated to obtain generated data, the image X' generated in this step and Y are inputted into the discriminator $D_Y$, the discrimination loss function is updated, and whether the data is data of the real scene or data generated by the generator is determined;

S6.2: in the present invention, Y is inputted into the generator F, X style simulated data of the vegetation Y, denoted by Y', can be obtained by training, then the reconstruction loss function is updated to obtain generated data, the image X and Y' generated in this step are inputted into the discriminator $D_X$, the discrimination loss function is updated, and whether the data is data of the real scene or data generated by the generator is determined;

S7: the training samples X and Y are inputted into the generator and the discriminator for training and update. The purpose of the generator is to fool the discriminator by the generated image, and the purpose of the discriminator is to identify the authenticity of the image. After the generator and the discriminator undergo gambling, the "falsifying" ability of the generator is increasingly strong, and the discriminant ability of the discriminator is also increasingly strong. Finally, the discriminator cannot distinguish whether the data is real data or data generated by the generator, that is, the adversarial process reaches a state of dynamic equilibrium. The specific implementation is as follows:

S7.1: an image X in the vegetation data set X of the real target scene is selected as a sample and inputted into the generator G, and after the inputted X is processed by the generator, an image y ' that simulates the winter vegetation style is outputted, that is $$G(x)=y\text{ '};$$

S7.2: an image y in the data set Y of the winter vegetation is selected as a sample and inputted into the generator F, and after the inputted y is processed by the generator, an image x' that simulates the vegetation style of the target experimental scene is outputted, that is F(y)=x';

S7.3: the discriminator $D_Y$ is created, and the image y' generated in S7.1 and any image y in the data set Y are inputted to make the loss function of the discriminator $D_Y$ as small as possible, wherein the loss function is:

$$L_{GAN}(F,D_Y,X,Y)=E_{y \sim p_{dataa}(y)}[\log D_Y(y)]+E_{x \sim p_{data}(x)}[\log(1-D_Y(G(x)))] \quad (6)$$

In formula (6), $E_{x \sim p_{dataa}(x)}$ indicates that the image y in the collected data set Y of the winter vegetation complies with a mathematical expectation of real data probability distribution; $E_{x \sim p_{dataa}(x)}$ indicates that the generated image y' simulating the style of the winter vegetation, i.e. G (x), complies with a mathematical expectation of generated data probability distribution; $D_Y$ (y) indicates an output value after the image y is inputted into the discriminator, that is, a probability that the image is a real image; and $D_Y(G(x))$ indicates an output value after the generated image y', i.e. G (x), is inputted into the discriminator, that is, a probability that the image is a real image;

After the generator and the discriminator reach a dynamic equilibrium, $D_Y(y) \approx D_Y(G(x))$, then $y \approx G(x)$, and the training of the generator G is completed;

S7.4: the discriminator $D_X$ is created, and the image x' generated in S7.2 and any image X in the data set X are inputted to make the loss function of the discriminator $D_X$ as small as possible, wherein the loss function is:

$$L_{GAN}(G,D_X,X,Y)=E_{x \sim p_{dataa}(x)}[\log D_X(x)]+E_{y \sim p_{dataa}(y)}[\log(1-D_X(F(y)))] \quad (7)$$

In formula (7), $E_{x \sim p_{dataa}(x)}$ indicates that the cut image X in the vegetation image data set X of the real target scene complies with a mathematical expectation of real data probability distribution; $E_{y \sim p_{dataa}(y)}$ indicates that the generated image x' simulating the vegetation style in the real target scene, i.e. F(y), complies with a mathematical expectation of generated data probability distribution; $D_X(x)$ indicates an output value after the image X is inputted into the discriminator, that is, a probability that the image is a real image; and $D_X(F(y))$ indicates an output value after the generated image x', i.e. F(y), is inputted into the discriminator, that is, a probability that the image is a real image;

After the generator and the discriminator reach a dynamic equilibrium, $D_X(x) \approx D_X(F(y))$, then $x \approx F(y)$, and the training of the generator F is completed; S7.5: the image y' that is generated in S7.1 and simulates the style of the winter vegetation, i.e. G(x), is inputted into the generator F to obtain an image F(G(x)); the image x' that is generated in S7.2 and simulates the vegetation style in the real target scene, i.e. F (y), is inputted into the generator G to obtain an image G(F(y)); A cycle consistency loss function is defined as follows:

$$L_{cyc}(F,G,X,Y)=E_{x \sim p_{dataa}(x)}[\|F(G(x))-x\|_1]+E_{y \sim p_{dataa}(y)}[\|G(F(y))-y\|_1] \quad (8)$$

In formula (8), F(G(x)) is an image outputted after the image G(x) is generated from the image X in S7.1 by the generator G and then inputted into the generator F; G(F(y)) is an image outputted after the image F(y) is generated from the image y in S7.2 by the generator F and then inputted into the generator G; $\|F(G(x))-x\|_1$ indicates a mean square error between the image F(G(x)) generated by two times of generator training and the vegetation image X in the real target scene, and the smaller the value of the mean square error is, the better the effect of the image generated by training is; $\|G(F(y))-y\|_1$ indicates a mean square error between the image $G(F(y))$ generated by two times of generator training and the collected winter vegetation image y, and the smaller the value of the mean square error is, the better the effect of the image generated by training is;

The final loss function is as follows:

$$L = L_{GAN}(F, D_Y, X, Y) + L_{GAN}(G, D_X, X, Y) + \lambda L_{cyc}(F, G, X, F) \quad (9)$$

In formula (9), $\lambda$ is a constant used to adjust the proportion, L represents the overall loss of the image style migration effect, and the smaller the loss value is, the more successful the training is, that is, the style of the style-migrated image is closer to the style of the target image;

S8: the operations of S5, S6, and S7 are also performed on the targets with fixed spatial attributes, such as roads, buildings, and pillars, outputs thereof are synthesized into one image according to coordinates, and the synthesized image is a style-migrated regional image except unfixed spatial attributes;

S9: the operations of S5, S6, and S7 are respectively performed on humans with unfixed spatial attributes, the trajectory of the output is predetermined according to the simulated behavior such as wandering, walking, or running, and the humans are generated in the scene of S8.

In this embodiment, a target scene in summer is subjected to style migration through the above steps to simulate a winter scene, and the change method for a specific scene based on temporal and spatial attribute requirements enables the migrated image to make up for missing scene data in a specific state in a database.

Based on the same inventive concept, the objective of this embodiment is to provide a computing device, including a memory, a processor, and a computer program stored on the memory and running on the processor, wherein the processor executes the program to implement the steps of the scene change method combining instance segmentation and cycle generative adversarial networks in the above embodiment.

Based on the same inventive concept, the objective of this embodiment is to provide a computer-readable storage medium.

A computer-readable storage medium stores a computer program thereon, and the program is executed by a processor to implement the steps of the scene change method combining instance segmentation and cycle generative adversarial networks in the above embodiment.

In another embodiment, a scene change system combining instance segmentation and cycle generative adversarial networks is disclosed, including:

an instance segmentation module, configured to: process a video of a target scene and then input the video into an instance segmentation network to obtain segmented scene components, that is, obtain mask cut images of the target scene; and a scene change module, configured to: process targets in the mask cut images of the target scene by using cycle generative adversarial networks spatial attribute requirements to generate data in a style-migrated state, and generate style-migrated targets with unfixed spatial attributes according to a specific spatial trajectory to achieve a scene change effect.

The steps involved in the device of the above embodiment correspond to those of the method type embodiment 1, and the specific implementation there of may be referred to the relevant description of the embodiment 1. The term "computer-readable storage medium" should be understood as a single medium or multiple media including one or more instruction sets; and it should also be understood as any medium that can store, encode, or carry instruction sets executed by a processor to implement any method in the present disclosure.

It should be appreciated by those skilled in the art that the modules or steps of the present disclosure can be implemented by a general computer device, alternatively, can be implemented by program codes executable by a computing device, and thus can be stored in a storage device and executed by the computing device, or in some cases, the modules or steps are respectively fabricated into individual integrated circuit modules, or a plurality of modules or steps of them are fabricated into a single integrated circuit module. The present disclosure is not limited to any specific combination of hardware and software.

Described above are merely preferred embodiments of the present disclosure, and the present disclosure is not limited thereto. Various modifications and variations may be made to the present disclosure for those skilled in the art. Any modification, equivalent substitution, improvement or the like made within the spirit and principle of the present disclosure shall fall into the protection scope of the present disclosure.

Although the specific embodiments of the present disclosure are described above in combination with the accompanying drawing, the protection scope of the present disclosure is not limited thereto. It should be understood by those skilled in the art that various modifications or variations could be made by those skilled in the art based on the technical solution of the present disclosure without any creative effort, and these modifications or variations shall fall into the protection scope of the present disclosure.

The invention claimed is:

1. A scene change method combining instance segmentation and cycle generative adversarial networks, comprising:
    processing a video of a target scene and then inputting the video into an instance segmentation network to obtain segmented scene components, that are mask cut images of the target scene; and
    processing targets in the mask cut images of the target scene by using the cycle generative adversarial networks according to requirements of temporal attributes to generate data in a style-migrated state, then classifying the targets according to requirements of spatial attributes, and if-when the spatial attributes of the targets are spatially unfixed, generating the targets according to a specific spatial trajectory to achieve a scene change effect.

2. The scene change method combining instance segmentation and cycle generative adversarial networks according to claim 1, wherein when the instance segmentation network is trained, a public data set or a private data set is annotated based on a content, and the public data set is inputted into the instance segmentation network for training, so that the network has content-based region segmentation ability.

3. The scene change method combining instance segmentation and cycle generative adversarial networks according to claim 1, wherein the processing a video of a target scene comprises extracting frame images of the video, integrating the frame images into a data set, and inputting the data set into a trained instance segmentation network.

4. The scene change method combining instance segmentation and cycle generative adversarial networks according to claim 3, wherein the instance segmentation network processes data in the data set to obtain a mask of each target in the target scene, saves coordinates of the mask, reads the coordinates, visualizes the obtained coordinates of the mask, and then cuts the mask to obtain an image of a dynamic part of the target scene.

5. The scene change method combining instance segmentation and cycle generative adversarial networks according to claim 2, wherein when the cycle generative adversarial networks are trained, the target scene is cut into parts using the public data set or the private data set according to the mask coordinates, and images of each part that meet temporal attribute requirements respectively are acquired and integrated into a target training set.

6. The scene change method combining instance segmentation and cycle generative adversarial networks according to claim 5, wherein for targets with fixed spatial attributes in the target scene, mask cut images of the targets and a corresponding target training set thereof are inputted to a cycle generative adversarial network respectively, and a cycle generative adversarial network model is trained according to different contents to obtain a content-adaptive generative adversarial network model.

7. The scene change method combining instance segmentation and cycle generative adversarial networks according to claim 5, wherein for targets with unfixed spatial attributes in the target scene, regions of such targets appearing in the target scene are fixed, mask cut images of the targets and acquired human images in a target season or time period are inputted into a cycle generative adversarial network, and a cycle generative adversarial network model is trained to obtain a trained generative adversarial network model.

8. A scene change system combining instance segmentation and cycle generative adversarial networks, comprising:
    an instance segmentation module, configured to: process a video of a target scene and then input the video into an instance segmentation network to obtain segmented scene components, that are mask cut images of the target scene; and
    a scene change module, configured to: process targets in the mask cut images of the target scene by using the cycle generative adversarial networks according to requirements of temporal attributes and spatial attributes to generate data in a style-migrated state, and generate style-migrated targets with unfixed spatial attributes according to a specific spatial trajectory to achieve a scene change effect.

9. A computing device, comprising a memory, a processor, and a computer program stored on the memory and running on the processor, wherein the processor executes the program to implement the steps of the method according to claim 1.

10. A non-transitory computer-readable storage medium, storing a computer program thereon, wherein the program is executable by a processor to implement the steps of the method according to claim 1.

* * * * *